25910
Jan. 28, 1964     F. W. FLYNN     3,119,525
CARD-FEEDER
Filed Oct. 8, 1962     11 Sheets—Sheet 1
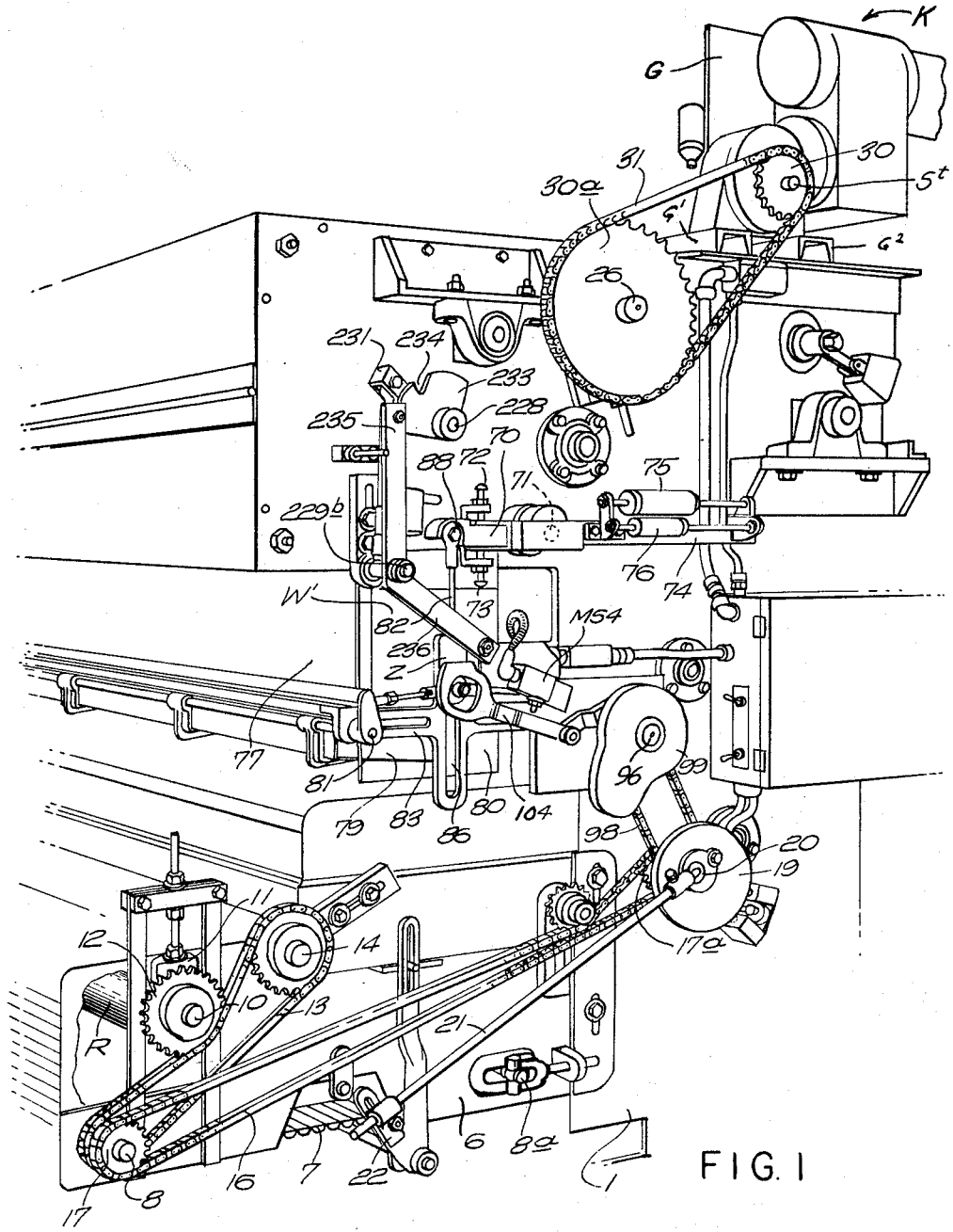
FIG. I
INVENTOR.
Francis W. Flynn
BY
Roberts Cushman & Grover
ATT'YS Jan. 28, 1964    F. W. FLYNN    3,119,525
CARD-FEEDER Filed Oct. 8, 1962    11 Sheets-Sheet 2

INVENTOR.
Francis W. Flynn
BY
Roberts Cushman & Grover
ATT'YS

Jan. 28, 1964  F. W. FLYNN  3,119,525
CARD-FEEDER

Filed Oct. 8, 1962  11 Sheets-Sheet 3

INVENTOR.
Francis W. Flynn
BY
Roberts Cushman & Grover
ATT'YS.

Jan. 28, 1964  F. W. FLYNN  3,119,525
CARD-FEEDER
Filed Oct. 8, 1962  11 Sheets-Sheet 5
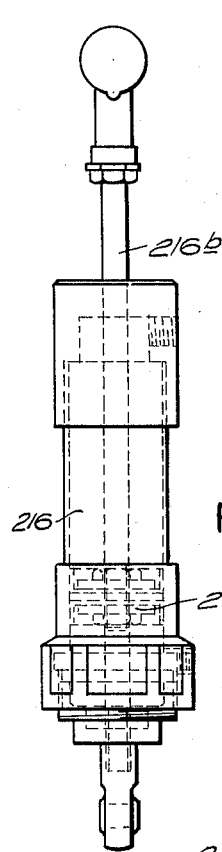
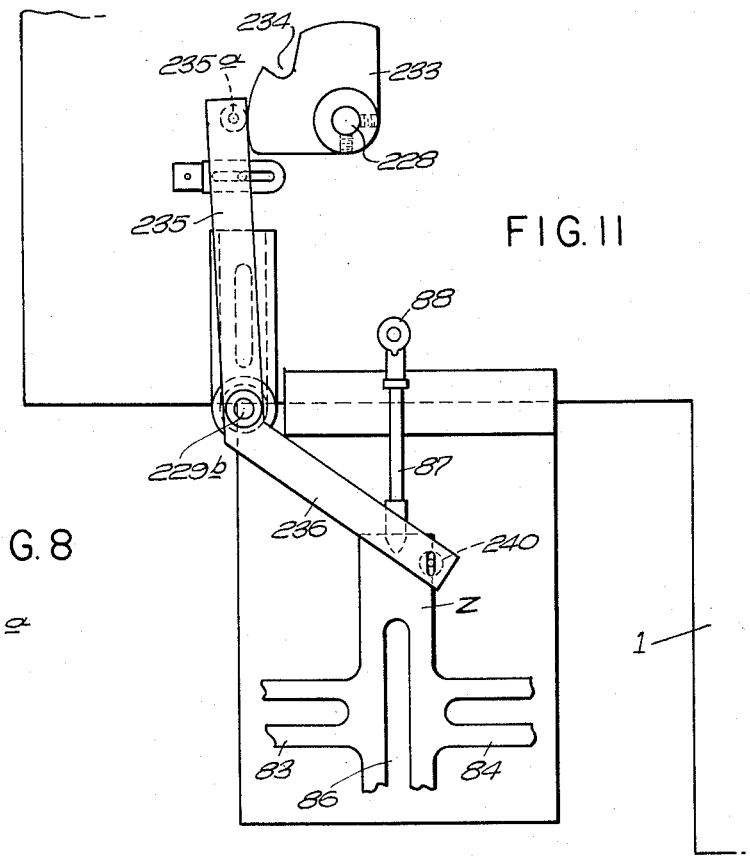
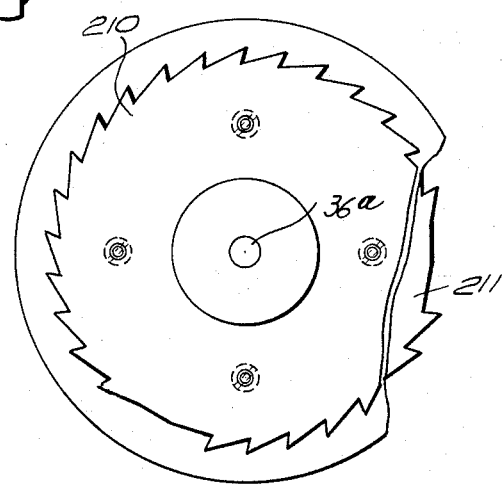
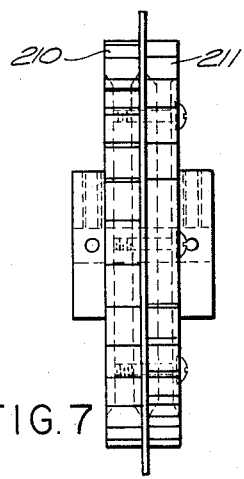
INVENTOR.
Francis W. Flynn
BY
Roberts Cushman & Grant
ATT'YS

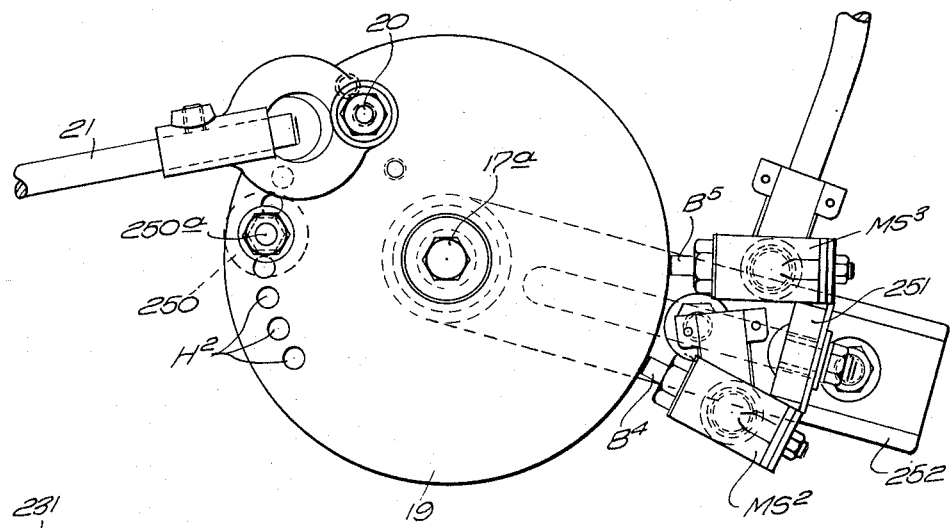
FIG. 14
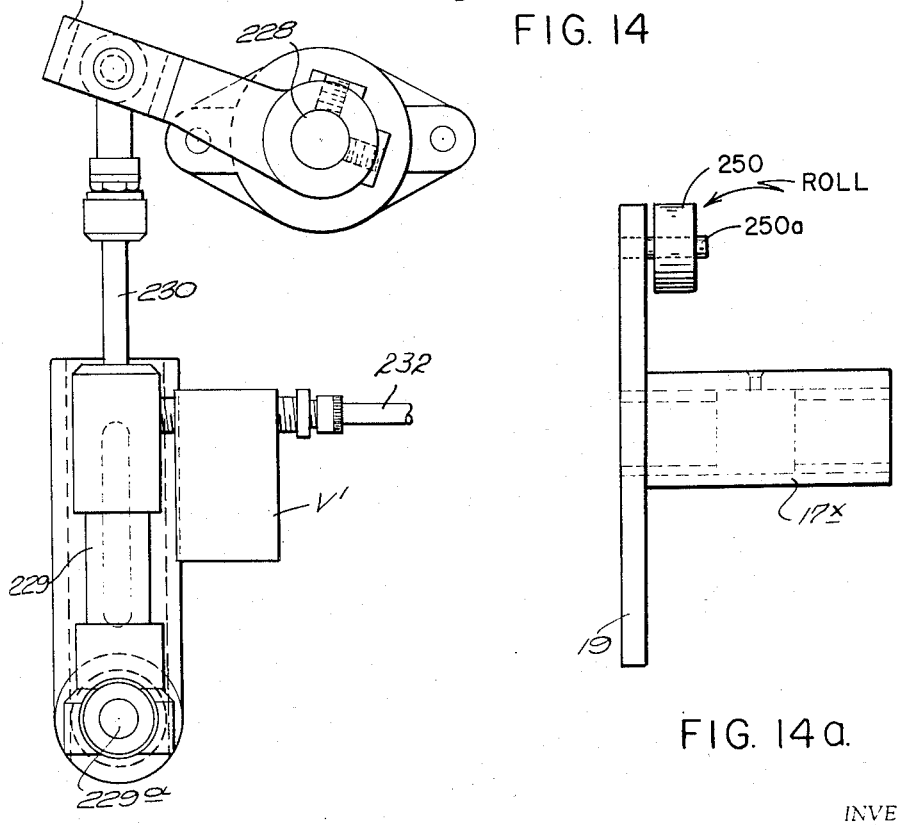
FIG. 10
FIG. 14a.

Jan. 28, 1964  F. W. FLYNN  3,119,525
CARD-FEEDER

Filed Oct. 8, 1962  11 Sheets-Sheet 8

INVENTOR.
Francis W. Flynn
BY
Roberts Cushman & Grover
ATT'YS.

Jan. 28, 1964  F. W. FLYNN  3,119,525
CARD-FEEDER
Filed Oct. 8, 1962  11 Sheets-Sheet 9

INVENTOR.
Francis W. Flynn
BY
ATT'YS

Jan. 28, 1964  F. W. FLYNN  3,119,525
CARD-FEEDER
Filed Oct. 8, 1962  11 Sheets-Sheet 11
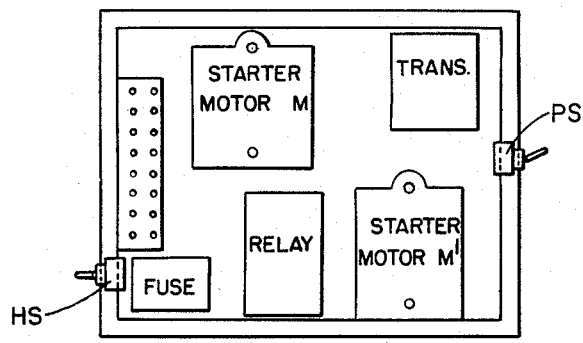
FIG. 17
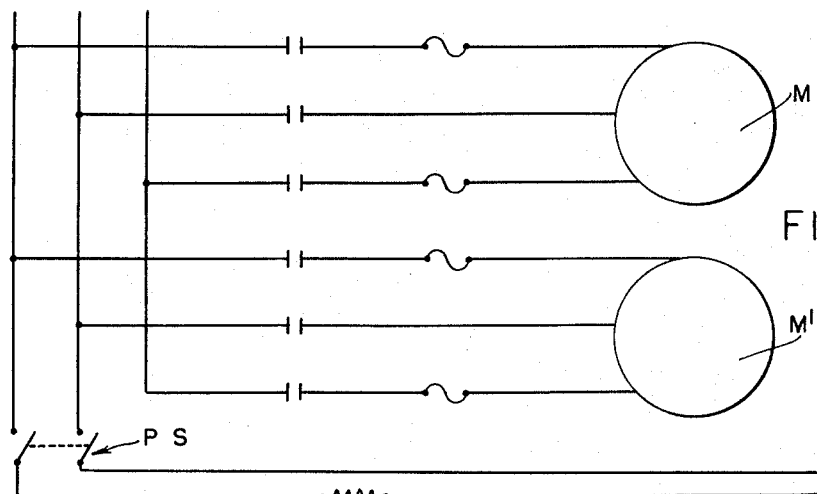
FIG. 18
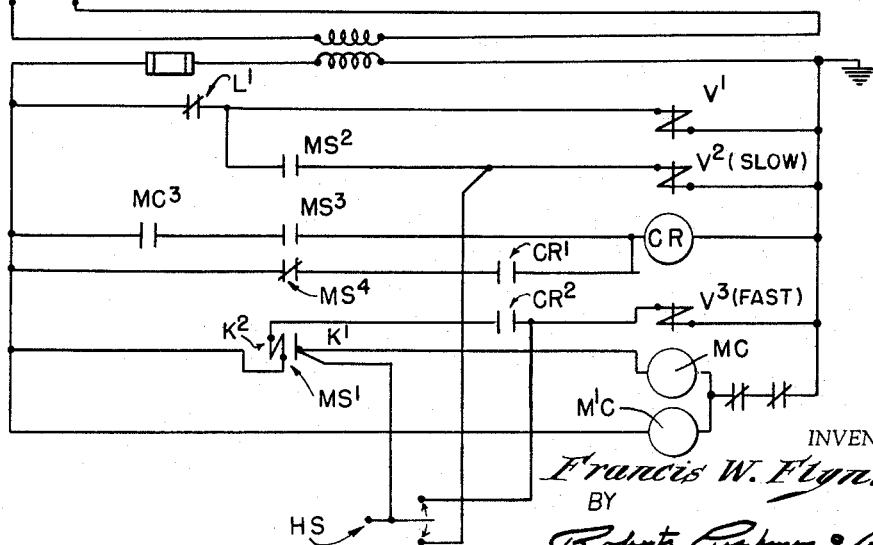
INVENTOR.
Francis W. Flynn
BY
Roberts Cushman & Grace
ATT'YS United States Patent Office 3,119,525
Patented Jan. 28, 1964

3,119,525
CARD-FEEDER
Francis W. Flynn, West Boylston, Mass., assignor to Geo. S. Harwood & Son, Inc., Worcester, Mass., a corporation of Massachusetts
Filed Oct. 8, 1962, Ser. No. 229,028
33 Claims. (Cl. 222—55)

This invention pertains to weighing machines designed to deliver a continuous succession of individually weighed batches of material to a receptacle or processing apparatus; for more specific example, a weighing machine of the type commonly known as a "Bramwell Feeder," designed to deliver fibrous textile material to a card, garnett or similar fiber-processing apparatus.

In general, such a feeding machine or feeder comprises a hopper or bin designed to receive and hold a relatively large supply of the particular fibers which are to be fed and processed. The effective bottom of this hopper or bin is usually in the form of a substantially horizontal conveyor or slat apron whose motion is such as to urge fibers forwardly from the undersurface of the mass in the bin and to deliver them to the lower upgoing portion of a substantially vertical conveyor commonly known as a "spike apron." This spike apron is equipped with a multiplicity of pins or spikes so arranged as to engage and pick up the fibers as they are delivered against its upgoing face by the slat apron. A combing device, usually an oscillatory toothed element, is arranged closely adjacent to the upgoing run of the spike apron and is effective to knock back and down into the bin or hopper excessive quantities of fibers being carried upwardly by the spike apron. A rotary or reciprocating doffing device, adjacent to the upper portion of the spike apron's downgoing run, acts to strip off from the spike apron the fiber which is clinging to said downgoing run.

The fibers so stripped from the spike apron fall down into a weighing box or "scale pan" supported by a counterbalanced beam pivotally mounted so as to be responsive to a predetermined weight of stock received by the scale pan. The overbalancing of the weighing assembly, resultant from the receipt of a predetermined weight of fibers, automatically stops the spike apron until the scale pan has been emptied. Commonly, the feeder is provided with a so-called "catch pan" or "shut-off door" between the doffing device and the scale pan to intercept fibers doffed from the spike apron after the scale pan has overbalanced in response to the reception of the predetermined load, thereby to prevent the delivery of additional material into the scale pan after the proper weight has been received.

Automatic means periodically opens the scale pan to dump its contents, whether or not the pan has received the proper amount of fiber. The contents of the pan thus dumped fall onto a constantly moving delivery conveyor or slat apron and under ideal conditions the operation of the feeder is such that a continuous succession of unseparated weighings or batches of substantially equal weight are carried forward by the delivery conveyor and delivered to the receiving end of the processing machine. The primary purpose of the weighing machine or feeder is to deliver to the processing machine (particularly to a carding machine), a flow of fibrous stock of maximum uniformity in respect to weight. The achievement of this is obviously dependent upon the formation of dumpings from the scale pan which vary from one another in weight to a minimum extent.

It is well-known that a major cause of difference in weight between successive dumpings of fibers from the scale pan of such a machine is the variation in the rate at which the spike apron picks up fibers from the supply in the hopper or bin and thus the rate at which they are stripped off into the scale pan. If the pick-up of fibers by the spike apron is at too slow a rate, the pan will be dumped by the cyclical operation of the pan-opening mechanism before it has received a weight of fibers such as to overbalance the pan. In that case, the scale will have performed no actual weighing function and the quantity of fibers dumped when the pan opens will be less than the prescribed amount necessary to provide an adequate supply to the processing machine. It may here be noted that the normal overbalancing action of the scale mechanism, in response to the receipt of a predetermined weight of stock, occupies a small but nevertheless measurable amount of time. If the spike apron carries only a light or thin body of fiber, a relatively small quantity of fibers will fall into the scale pan between the moment when the overbalancing motion commences and the moment when the spike apron actually stops and the catch pan (if any) closes; whereas, on the other hand, if the body of fiber carried by the spike apron is thick or heavy, a substantially larger quantity of fibers will fall into the scale pan between the moment at which the pan begins to sink in response to the load and the moment at which the spike apron stops and the catch pan (if any) closes. In practice therefore, a light flow of fiber delivered by the spike apron causes lighter scale dumpings than does a heavy flow, and vice versa.

The chief cause for variation in the quantity of stock picked up from minute-to-minute and delivered by the spike apron is the variation in the quantity of stock at any given time in the supply hopper or bin, or the variation in the density of the supply and the resultant degree of force with which the stock is pressed against the pins of the upgoing spike apron. When the hopper is freshly filled to full capacity or when for any other reason the stock, where engaged by the spike apron, is unduly dense, each spike apron pin will tend to pick up and deliver a larger quantity of fibers than when the supply in the hopper or bin is loose or has become largely depleted by continuous and unattended operation of the feeder. Thus, at any given surface speed of the spike apron, it will take less time for the spike apron to deliver an overbalancing load to the scale mechanism when the hopper or bin is full than it does when the hopper is nearly empty.

Briefly restated, a full supply-hopper, with consequently a thickly loaded spike apron, moving at a fixed speed may normally be expected to cause the scale pan to overbalance early in the weighing cycle and to deliver relatively heavy dumpings of stock; while, on the other hand, a depleted supply in the hopper, resulting in a thinly loaded spike apron, traveling at the same speed, will ordinarily cause the scale to overbalance late, if at all, and to deliver light dumpings.

Objects of the present invention are first, to prevent the delivery of unweighed batches of fiber by the scale pan and second, to reduce or substantially to eliminate weight variations in successive dumpings resultant from variations in the quantity or condition of stock in the feed hopper or bin, by providing means for so regulating the surface speed of the spike apron that its rate of pick-up and delivery of fibers per second will remain constant within very narrow limits, regardless of the quantity or density of material in the feed hopper; thus to cause the scale pan to overbalance at very nearly the same moment in every weighing cycle and to dump closely equal weights of fibers every time, regardless of the quantity of stock in the hopper.

A further object is to provide means whereby the rate of flow of fiber into the scale pan is substantially the same, during each cycle, at the instant at which the scale beam commences to tip.

In the attainment of the above objects, the present invention provides means whereby if (during a predetermined fractional or "control" portion of the weighing cycle before whose commencement and after whose termination it is undesirable for the scale to overbalance) the scale does overbalance before the commencement of said portion of the cycle, the speed of the spike apron will be automatically reduced, or alternatively, if the scale pan has not overbalanced at the termination of said portion of the cycle, the speed of the spike apron will be automatically increased. Furthermore, the means for thus varying the speed of the spike apron is so devised that, if a series of successive small adjustments of the speed of the spike apron, in one direction or the other, is requisite to insure the overbalancing of the scale pan between the commencement and terminus of said predetermined control portion of the cycle, the control mechanism will automatically make such a series of successive adjustments until eventually the overbalance will take place between the commencement and terminus of said fractional or control portion of the cycle, whereupon further adjustment ceases and the spike apron will now move at the same speed, during succeeding cycles, because it has attained the optimum speed for producing maximum weighing efficiency. However, if the supply of fiber in the hopper becomes so depleted that the spike apron now picks up a lesser load of fiber with the result that the scale pan does not overbalance until after the terminus of said predetermined control portion of the weighing cycle, the speed of the spike apron will automatically be increased, cycle-after-cycle, until the optimum rate of fiber-delivery has been re-established. Obviously, timely replenishment of the hopper may render unnecessary such automatic speed-up adjustment, or, at least, shorten the period of such adjustment.

The invention further contemplates manual means for adjusting the speed of the spike apron, for example, to avoid the possibility of the delivery of unduly heavy dumpings immediately after refilling of the hopper and when, because of the previous depletion of the supply, the spike apron has been automatically adjusted to high speed.

It is well recognized in the art that maximum uniformity of scale dumpings is attained by driving the spike apron at the lowest permissible rate and making the weighing period as long as allowable, consistent with the avoidance of a missed weighing, because the percentage of strippings, dropping into the scale pan during its overbalancing motion, will be least under these conditions relative to the total weight for which the scale has been adjusted. For this reason, in accordance with the present invention, that fractional or control portion of the weighing cycle which is selected for the automatic alteration of spike apron speed should preferably be located in time as late in the weighing cycle as is practical. It is further to be noted that, in accordance with the present invention, the linear speed of the spike apron is constant during the entire scale-filling period of an individual cycle—the speed only being changed before or after the scale-filling period. It is characteristic of the present invention that there may be a progressive speeding-up of the spike apron by small increments during a period of many successive cycles to counteract the effects of normal depletion of the supply in the hopper, thus preventing the occurrence of a missed weight; while, on the other hand, it provides for a progressive decrease in the speed of the spike apron by small decrements in response to premature tipping of the scale pan during successive weighing cycles.

Other and further objects and advantages of the invention will be pointed out in the following more detailed description and by reference to the accompanying drawings wherein:

FIG. 1 is a fragmentary perspective view looking rearwardly and toward the left-hand side of the machine, the scale pan being shown in closed position;

FIG. 6 is an elevation, partly broken away, showing one side of a ratchet wheel assembly comprised in the speed-varying mechanism;

FIG. 7 is an edge elevation of the ratchet wheel assembly;

FIG. 8 is an elevation illustrating an air cylinder comprised in the mechanism for varying the speed of the spike apron motor;

FIG. 10 is a fragmentary elevation illustrating the air-motor for actuating the catch-pan gate;

FIG. 11 is a fragmentary elevation showing locking means operative, under some conditions, to keep the gate of the catch pan closed;

FIG. 14 is a fragmentary elevation, showing certain of the microswitches and the rotary control element which cooperates therewith;

FIG. 14a is an edge elevation of the disc which carries the control element and its supporting sleeve;

FIG. 17 is a diagrammatic elevation showing the control panel; and

FIG. 18 is a circuit diagram illustrating the electrical connections comprised in the controlling mechanism.

Figure 1A:
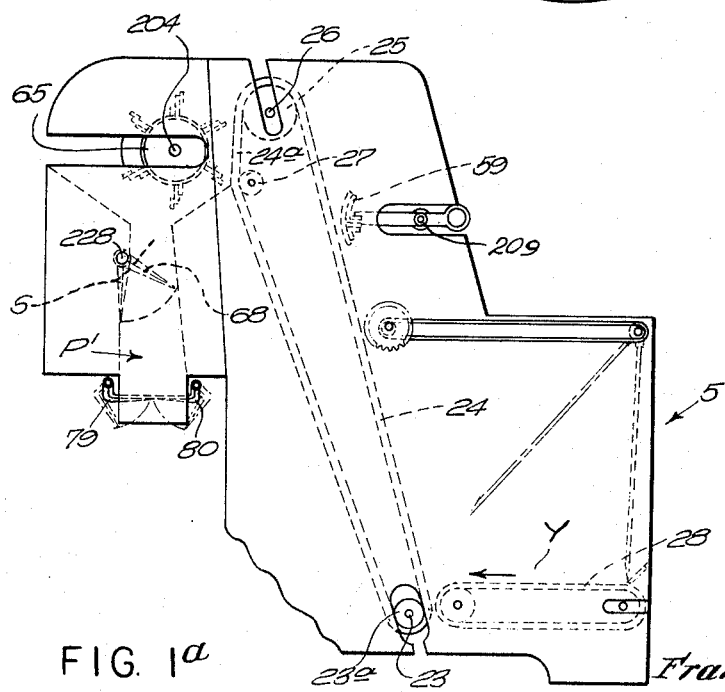
FIG. 1a is a fragmentary, small scale, diagrammatic side elevation, illustrating the relative positions of the feed hopper, spike apron, comb, doffer and catch pan; but omitting most other parts.
Figure 3:
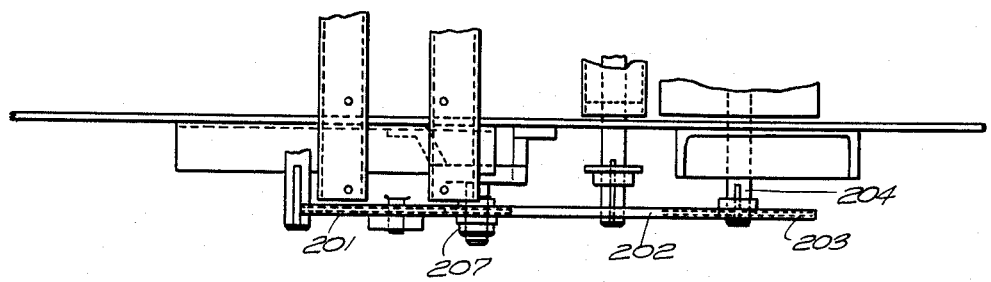
FIG. 3 is a fragmentary plan view of the parts shown in FIG. 2.

The weighing apparatus of the present invention is herein disclosed as embodied in a card-feeder of the general type of that illustrated and described in the patent to Jee et al., 2,702,177, dated February 15, 1955, and reference to that patent may be had for certain details which appear unnecessary to the present disclosure. Referring now to the drawings hereof, in particular to FIGS. 1 and 1a, there is diagrammatically illustrated, in the latter view, a feed hopper or bin 5; a horizontal slat apron 23 which forms the effective floor of said bin or hopper and which is power-driven by pawl-and-ratchet means (not shown), so that its upper run moves forwardly, or in the direction of arrow Y; a conveyor or spike apron shown in dotted lines and having the upgoing run 24 which receives fiber urged forwardly from the bin by the slat apron 23; a vibrating comb 49 which knocks off surplus fiber from the spike apron; and a doffer or beater 65 which knocks off the fiber from the downgoing run 24a of the spike apron into a vertically disposed chamber S having a movable gate or catch pan 68 which, in the closed position, prevents fiber from dropping from the catch pan S into a weighing box or scale pan $P^1$ which depends from one arm of a beam fulcrumed to turn about the axis of a shaft 71 (FIG. 1). The fibrous material which is dumped from the weighing box or scale pan falls onto an endless delivery apron 7 (FIG. 1). Rigid plates or wings 6 (one of which is shown in FIG. 1), adjustably attached to the side frame member 1 at opposite sides, respectively, of the machine, support the delivery apron 7 which is entrained about rollers carried by shafts 8 and 8a, respectively (FIG. 1), mounted in bearings in the wings 6, the bearing for the shaft 8a being horizontally adjustable. The shaft 8 is provided with a gear (not shown) at the right-hand side of the machine which receives its motion from the processing apparatus, for example a card, to which the fibrous material is delivered by the apron 7. An endless chain 16 (FIG. 1) is entrained about a sprocket 17 fixed to the left-hand end of shaft 8 and also about a sprocket (not shown) fixed upon a sleeve $17x$ (FIG. 14a) which turns on a stub-shaft 17a (FIG. 14). To the outer end of said sleeve there is fixed a crank disc 19 (FIGS. 1, 14 and 14a) carrying a crankpin 20 which actuates a rod 21 (FIG. 1) connected to a rocker arm 22 for moving the usual pushboard (not shown) which provides clear space on delivery apron 7 for the reception of each successive dumping of fiber from the pan $P^1$.

Figure 16:
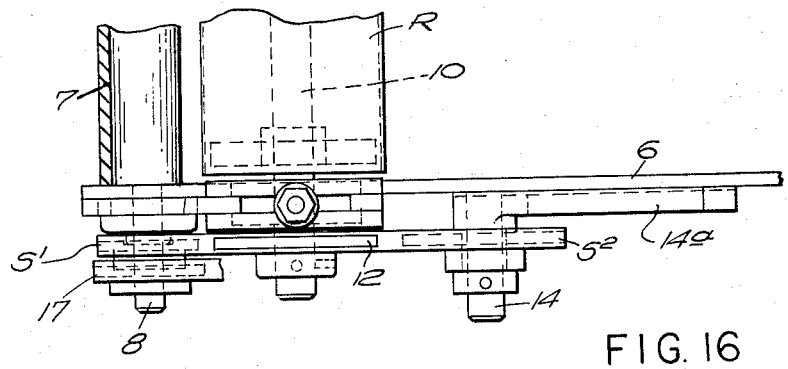
FIG. 16 is a fragmentary plan view of the parts shown in FIG. 15.
Figure 15:
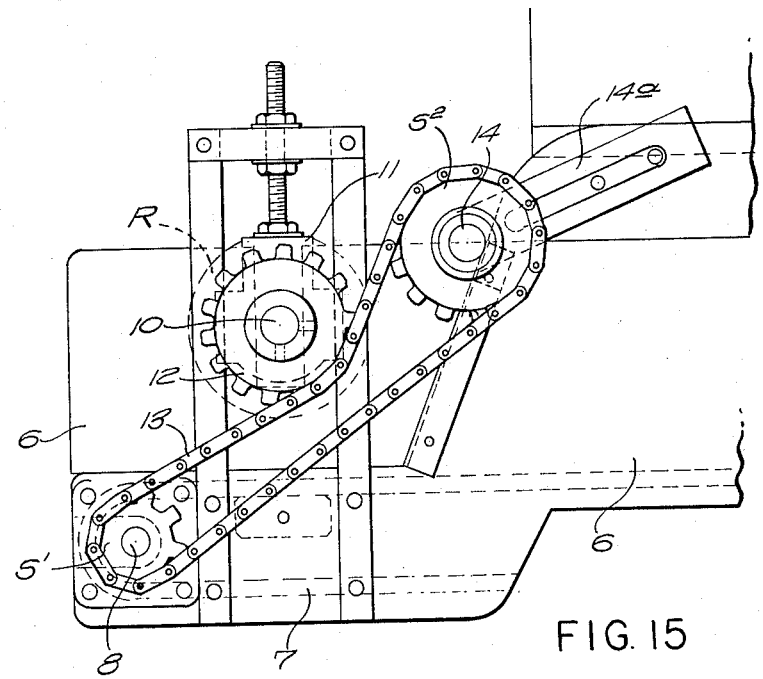
FIG. 15 is a fragmentary, left-hand side elevation (omitting certain parts), showing the compressor roll and the means for driving it.

For compressing successive weighings as they are dropped onto the delivery apron 7, there is provided a rotating compressor roll R (FIGS. 1 and 16) carried by a shaft 10 journaled in vertically adjustable bearing blocks 11 (FIG. 15) (only one of which is shown), supported by the wings 6. A sprocket 12, fixed to the shaft 10, is engaged by an endless sprocket chain 13 which embraces a sprocket $S^1$ (FIGS. 15 and 16) fixed to the shaft 8 and a second sprocket $S^2$ turning on a stub-shaft 14 fixed to an adjustable bracket 14a mounted on the left wing 6.

A shaft 23 (FIG. 1a) extends transversely across the machine and has its ends arranged in adjustable bearings and carries a roller 23a about which is entrained the lower bight of the endless spike apron, the rear upgoing run 24 (FIG. 1a) of this apron extending upwardly and forwardly from the lower part of the bin 5 to the upper part of the machine, where the spike apron is entrained about a roller 25 fixed to a shaft 26 (FIGS. 1 and 1a), whose ends turn in bearings carried by the machine frame. Preferably the forward, downwardly moving run 24a of the spike apron engages a roll 27, so arranged that the upper portion of the downwardly moving run 24a is substantially vertical.

Figure 4:
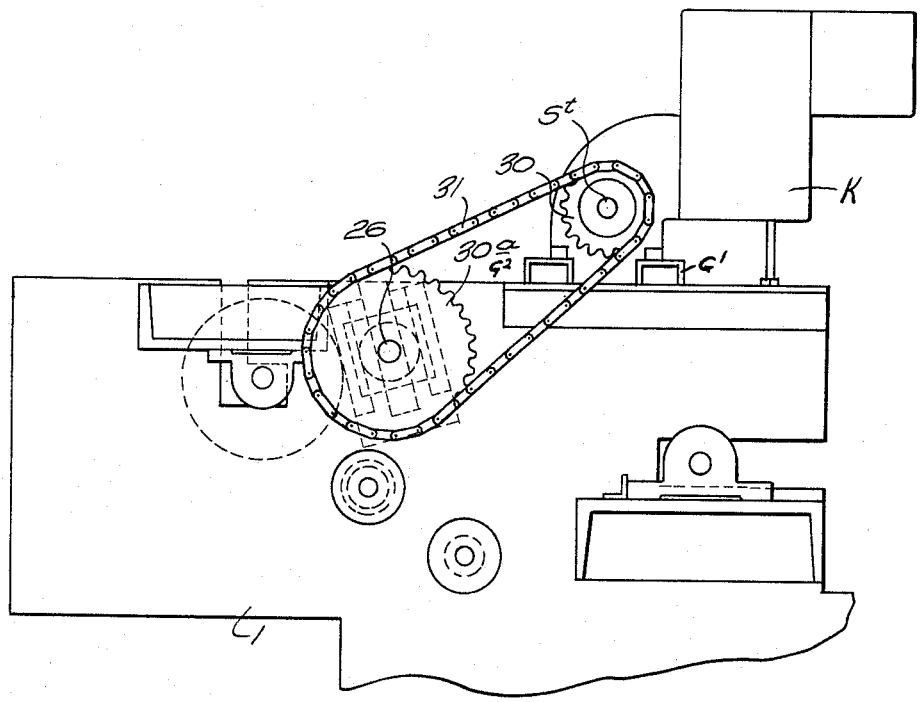
FIG. 4 is a fragmentary side elevation, looking at the left-hand side of the machine, showing the motor drive for the spike apron.

In accordance with the present invention, the spike apron is driven by a variable-speed, electrical motor M (FIG. 18) of conventional type, through an intermediate speed-reducing device (not shown), the motor and speed-reducer being housed within a casing K (FIGS. 1 and 4), mounted in connection with a rigid vertical plate G (FIGS. 1, 5 and 9), both of which are supported by and fixed to members $G^1$ and $G^2$ (FIGS. 1 and 4), which rigidly connect the upper parts of the frame member 1 at opposite sides, respectively, of the machine. The power delivery shaft $St$ (FIGS. 1 and 4) of this drive mechanism carries a sprocket 30 which is embraced by a sprocket chain 31 which passes about a sprocket wheel 30a fixed to the shaft 26. By this means, the spike apron may be driven at various speeds.

The weighing mechanism (FIG. 1) comprises a scale beam consisting of a pair of levers 70, one arranged at each side of the machine (only one being shown), and each mounted to rock on antifriction bearings about the fulcrum axis 71 (FIG. 1), the upward and downward motion of the forward arm of this beam being limited by adjustable stop screws 72 and 73. Each lever 70 has a rearwardly extending arm 74 (FIG. 1) which carries adjustable weights 75 and 76.

Figure 12:
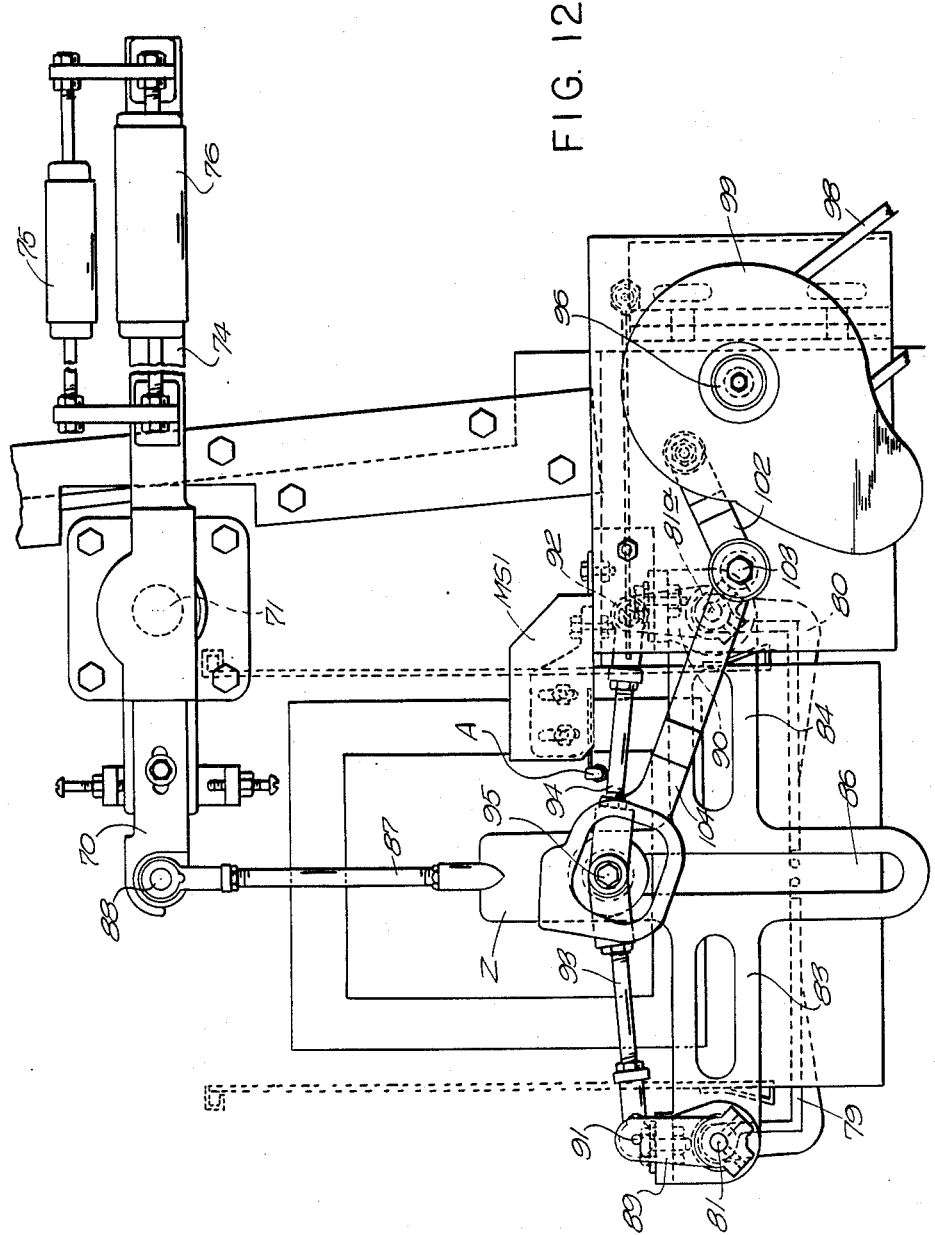
FIG. 12 is a fragmentary elevation, to larger scale than FIG. 1, showing the scale pan and its associated and controlling elements.

The weighing box or scale pan has stationary, spaced, front and rear walls, one of which is indicated at 77 (FIG. 1), and stationary end walls (one of which $W^1$ is shown) and which may be the side members of the frame 1 or parts fixed thereto. The major portion, at least, of the bottom of the scale pan (FIGS. 1 and 12) is constituted by two doors 79 and 80, respectively, which are fixed to shafts 81 and 81a (FIG. 12), mounted in bearings in the horizontal arms 83 and 84 of suspension members Z, one disposed at each side of the machine, the one which is here illustrated being cruciform. Each of these suspension members comprises a vertical part suspended by a rod 87 from the forward arm of the corresponding beam lever 70. The suspension member Z shown at the left-hand side of the machine, has an elongate vertical slot 86. A suitable antifriction bearing 88 is interposed between the upper end of the rod 87 and the lever arm 70 to which it is connected.

Each of the shafts 81 and 81a (FIG. 12) is provided with an upstanding crank arm 89 and 90, respectively, whose upper ends are connected by pivot bearings 91 and 92 with the ends of toggle link members 93 and 94, respectively, the proximate ends of said levers being pivotally connected by a pin 95 which projects outwardly through the slot 86 in the member Z. When the axis of the pin 95 is above a line joining the axes of the pivot bearings 91 and 92, the doors 79 and 80 are locked in closed position by the toggle action of the links 93 and 94 thus keeping the scale pan closed.

Figure 13:
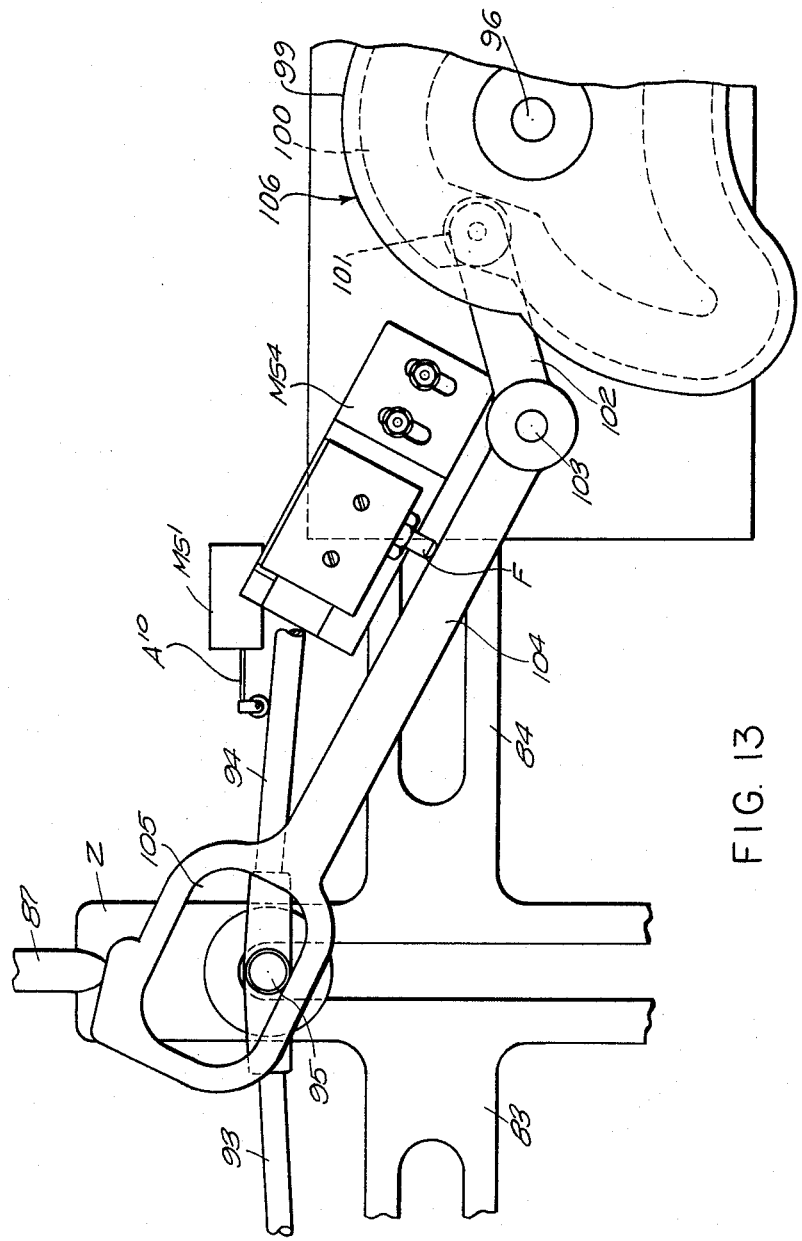
FIG. 13 is a fragmentary elevation, to larger scale than FIG. 12, showing the dumping and lifting lever and the microswitch associated therewith.

On a horizontal stub-shaft 96 (FIGS. 1, 12 and 13) there is mounted to turn a sprocket wheel (not here shown) about which is entrained an endless sprocket chain 98 (FIGS. 1 and 12) which also embraces a second sprocket wheel (not shown), which is fixed relatively to the crank disc 19 which, as above described, is driven continuously and at constant speed by the sprocket chain 16. A cam 99 (FIGS. 1 and 12) is driven by the chain 98. The sprocket wheels about which the chain 98 is entrained have the same number of teeth, and in setting of the machine the chain is so meshed with the teeth of the wheels that the cam 99 and disc 19 turn in exact, predetermined timed relation. The cam 99 has a groove 100 (FIG. 13) in its inner face which receives a cam follower roll 101 at the end of one arm 102 of a bell crank lever mounted to rock about a stub-shaft 103 fixed to the machine frame, the other and longer arm 104 of the bell crank lever having a wide slot or opening 105 in its end portion into which projects the outer end of the pivot pin 95 which connects the toggle links 93 and 94. The cam groove 100 is so shaped that, as the cam rotates (making one complete revolution for each weighing cycle), the arm 104 is swung downwardly (at times) so that the upper wall of the slot 105 contacts the pin 95 thus moving the toggle links downwardly below the dead-center position thereby permitting the doors 79 and 80 to open; while, at a later time in the rotation of the cam 99, the arm 104 rises and the lower wall of the slot 105 contacts the pin 95 thus restoring the toggle linkage to its initial position so as to close the doors 79 and 80 and concomitantly to raise the forward arm of the scale beam. Thus, assuming that the processing machine, for example a textile card, to which the fibrous material is to be delivered, runs at uniform speed, each "weighing cycle" will occupy exactly the same period of time. The shape of the cam groove is such that after thus raising the pin 95 to its highest position as shown in FIG. 13, the roll 101 enters a dwell portion of the cam groove 100 of a circumferential extent exceeding 180°, and while the roll is in this part of the groove the scale pin is closed and the arm 104 is so positioned that the walls of the slot 105 are spaced from pin 95.

A snap-action switch $MS^1$ (FIGS. 13 and 18) (diagrammatically indicated in FIG. 13) is secured to the machine frame. This switch has an actuating arm A[10] provided with a roll which lies in the path of the toggle link 94 as the latter rises to normal or pan-closing position, this switch being so connected into the control circuit (FIG. 18), as hereafter described, that when the link 94 is in normal position, the contact K[1] of the switch is thereby closed, so completing the circuit of the motor which drives the spike apron as to cause the spike apron to operate, but to break the circuit and automatically to stop the drive motor for the spike apron when the scale beam begins to tip.

Another switch MS[4] (FIGS. 13 and 18) is fixed to the machine frame so that its actuating pin F lies in the path of the lever arm 104. This switch is so connected into the control circuit (FIG. 18) that as the lever arm 104 rises thereby to close the door of the scale pan, the arm contacts the switch actuating pin and depresses the latter.

Figure 2:
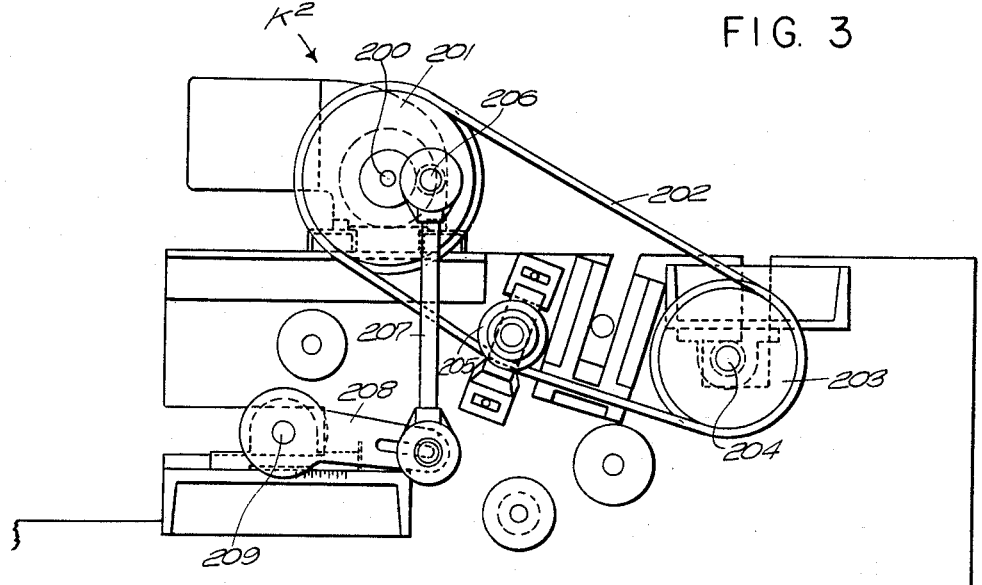
FIG. 2 is a fragmentary elevation looking at the right-hand side of the machine, illustrating a drive motor and associated means for driving the comb and doffer.

In that embodiment of the present invention which is here illustrated, the comb 59 and rotary doffer device 65 (FIG. 1a) are driven by an independent motor M[1] (FIG. 18), housed in a casing K[2] (FIG. 2) in association with a speed-reducer, the motor and speed-reducer being of conventional type. The output shaft 200 (FIG. 2) of the speed-reducer carries a sprocket wheel 201 which is embraced by an endless chain 202 passing about a sprocket wheel 203 fixed to the shaft 204 of the rotary doffer device 65. The chain engages an adjustable idler sprocket 205.

The sprocket wheel 201 carries a crankpin 206 (FIG. 2) which, by means of a connecting rod 207, rocks an arm 208 fixed to the shaft 209 upon which the comb 59 is mounted. Desirably, this shaft 209 is mounted in a carriage, adjustable horizontally to vary the position of the comb relatively to the spike apron. When the motor M[1] is energized, the comb is rocked and the doffer device 65 is rotated at a predetermined constant speed, regardless of the speed of the spike apron.

In accordance with the present invention, the variable speed motor M (FIG. 18), of conventional type, for driving the spike apron comprises a rotatable speed-varying shaft 36a (FIG. 5) on which is fixed a ratchet assembly comprising two ratchet wheels 210 and 211 (FIGS. 5, 6 and 7), respectively, whose teeth face in opposite directions.

For driving the ratchet wheels 210 and 211 (FIG. 7), step-by-step, in opposite directions, pawls 212 and 213 (FIG. 5) are pivotally mounted upon the opposite arms, respectively, of a lever 214 of the first order fulcrumed to rock on a stub-shaft 215 fixed to the plate G above described. The lever 214 is rocked by a fluid pressure motor, here shown as comprising an air cylinder 216 (FIGS. 5 and 8), having therein a piston 216a attached to a piston rod 216b, whose upper end (FIG. 5) is pivotally connected to the lever 214, the piston being shown adjacent to the lower end of the cylinder in FIG. 8. To limit the rocking of the lever 214 a rod 217 (FIG. 5) is pivotally attached at its upper end to the lever 214 and is provided with spaced adjustable stop members 218 and 219 located at opposite sides of a fixed stop 220. Normally, the piston 216a is positioned approximately midway between the ends of cylinder 216.

Figure 9:
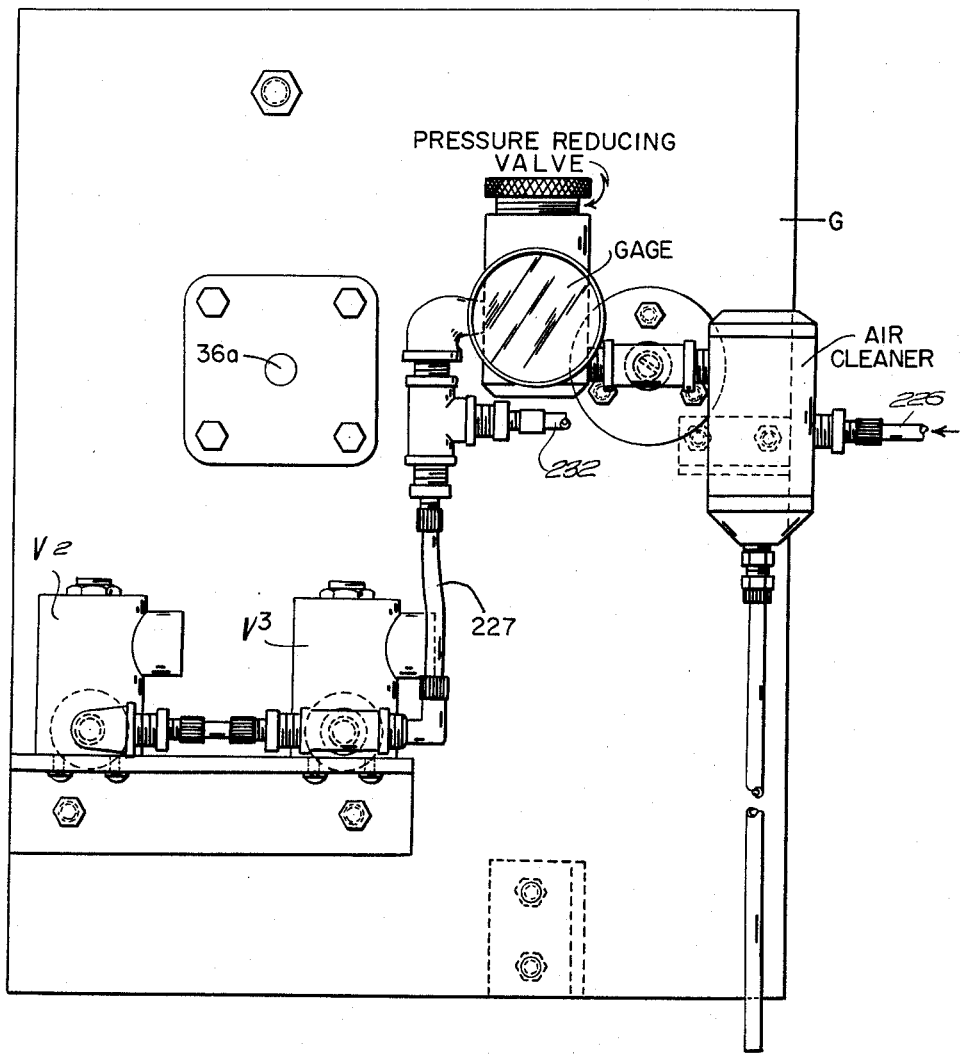
FIG. 9 is an elevation looking at the opposite side of the support upon which the parts illustrated in FIG. 5 are mounted, showing details of the pneumatic control means.

The air cylinder 216 is mounted at its lower end upon a supporting bracket 221 (FIG. 5) and has ports at its upper and lower ends, respectively, to which pipes 222 and 223 are connected. These pipes lead from solenoid valves V[2] and V[3] (FIGS. 9 and 18). Air under constant pressure from a suitable source is supplied through a pipe 226 (FIG. 9) to a cleaner, pressure-reducing valve and gauge from which it is delivered by a pipe 227 to the solenoid valves, which control the admission of air to one or another end of the cylinder. Normally, when no speed adjustment is being made, both solenoid valves V[2] and V[3] are closed and lever 214 is held in a horizontal or midposition by a weight. This weight, as here illustrated (FIG. 5), comprises a horizontal bar 260 having spaced pins 261 and 262 which overlie the lever 214 at opposite sides, respectively, of the fulcrum of the latter. This weight also comprises a pair of parallel, vertical guide rails 263 and 264 spaced apart to provide a slot for the reception of end portions of the stud 215 and of the speed-varying shaft 36a whereby the weight is guided for vertical movement. The lower ends of the guide rods are fastened to a block 265 which, together with the parts 260, 263 and 264, provide sufficient weight for the intended purpose. Suitable collars, or the like, on the stud 215 and the shaft 36a retain the weight in assembled relation to the other parts.

Figure 5:
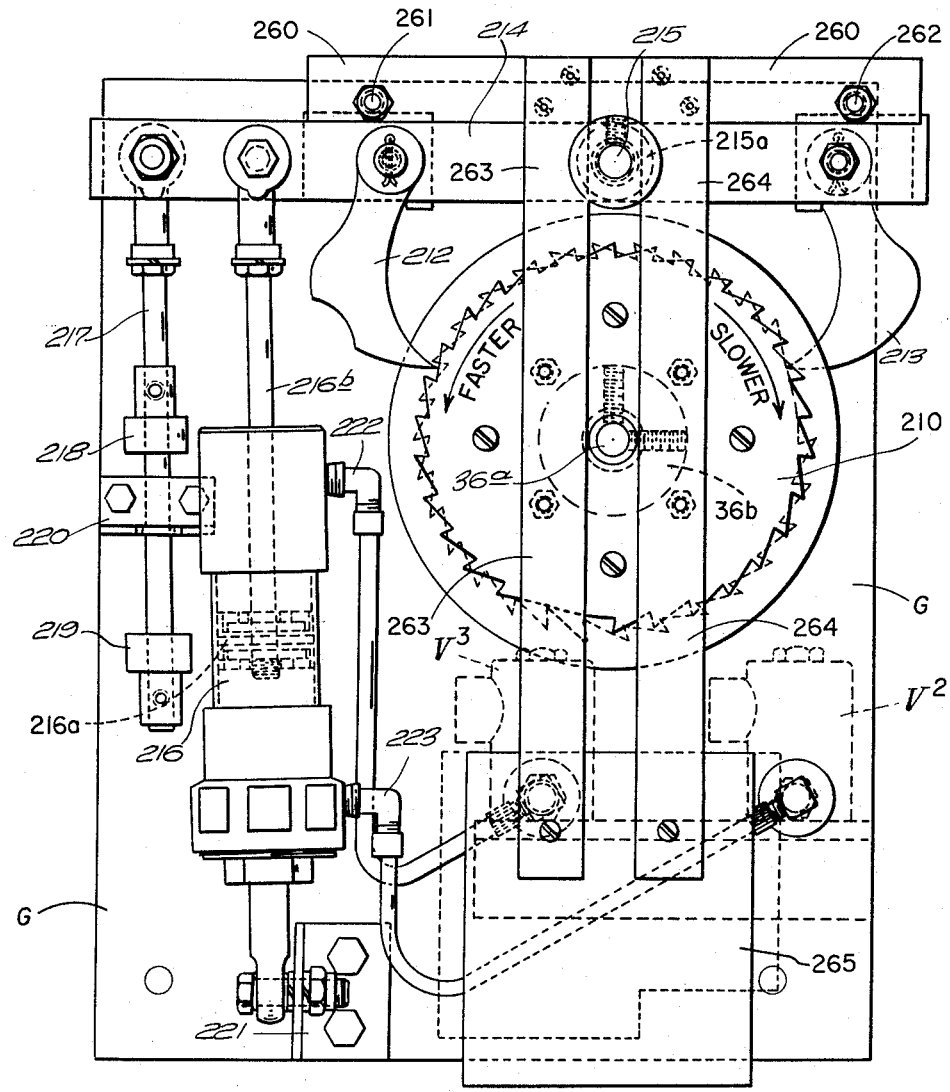
FIG. 5 is a fragmentary elevation, to larger scale, looking at the left-hand side of the machine, showing details of the means for automatically varying the speed of the spike apron motor.

When the lever 215 is in the horizontal position, as shown in FIG. 5, and both valves V[2] and V[3] are closed, both pawls 212 and 213 are inactive. If now, for example, the piston 216a is moved upwardly by the opening of the corresponding valve, the lever 214 will be rocked in a clockwise direction, as viewed in FIG. 5, thus lifting pin 261 and thereby raising the entire weight and, at the same time, the pawl 213 is moved downwardly so as to turn the ratchet assembly. As soon as the opened valve is closed and air exhausts from the cylinder, the weight will move downwardly and thus return all of the parts, including the piston, to neutral position. Conversely, downward motion of the piston from its midpoint will rock lever 214 in a counterclockwise direction and thus actuate the pawl 212. A weight is here employed for returning the parts to midposition because it is more reliable than a spring, although, if desired, a spring or any other suitable means might be employed for the purpose.

As will be made clear hereafter, the piston 216a can make only one stroke in one direction or the other during a given weighing cycle. As here illustrated, each ratchet wheel has one tooth for each 12° of the circumference. Thus, one stroke of the air cylinder piston will turn the speed-adjusting shaft of the spike apron motor through an arc of 12° only. In a preferred arrangement, the selected motor unit is such that a ¾ turn (about 270°) of the speed-adjusting shaft will triple the speed of the output shaft of the motor, for example, from a minimum speed of 22 r.p.m. to a maximum speed of 66 r.p.m. Thus, by way of example, it may be noted that it will require 22 or 23 adjustments of the speed control shaft to alter the speed of the output shaft of the conveyor motor by 46 r.p.m., the average extent of each adjustment, $$\frac{46 \text{ r.p.m.}}{22 \text{ or } 23}$$

being approximately 2 r.p.m. which is about 3% of a maximum speed of 66 r.p.m. and about 9% of a minimum shaft speed of 22 r.p.m. In other words, in accordance with the construction herein described, any change in the surface speed of the spike apron from one cycle to the next (if any change at all occurs) will be of the order of 3% to 9% upwardly or downwardly. It is thus evident that only a very slight change in speed of the spike apron will be made between successive weighing cycles (if any change at all is made).

Referring to FIGS. 5 and 6, it will be noted that in each ratchet wheel there are two teeth removed, the object being to prevent overtravel of the speed-adjusting shaft such as might cause injury to the motor which drives the spike apron. For instance, if the machine were allowed to continue operation for a substantial length of time after the supply of material in the hopper was completely exhausted, the machine would attempt to increase the speed of the spike apron at the end of every dumping cycle until damage might result if it were not for the missing teeth.

The gate 68 of the catch pan S is fixed to a shaft 228 (FIGS. 1a, 10 and 11), turning in bearings carried by the machine frame and this shaft is rocked thereby to close the catch pan gate 68 by motor means comprising an air cylinder 229 (FIG. 10) having a piston therein connected to a piston rod 230 whose upper end is pivotally connected to a crank arm 231 fixed to the shaft 228. The lower end of the cylinder 229 is pivoted to rock on a stud 229a fixed to the machine frame. Air is delivered to the solenoid valve V$^1$ (FIGS. 10 and 18) through pipe 232 (FIGS. 9 and 10) and when the solenoid valve V$^1$ is energized, air is admitted to the upper end of the cylinder 229 thereby forcing the piston down and turning shaft 228 counterclockwise (FIG. 10) to close catch pan gate 68. In order to prevent the catch pan from opening and dropping its contents (the scale beam having overbalanced), because of failure of electrical energy such as would de-energize the solenoid valve V$^1$, there is provided automatic locking means for holding the catch pan closed under such circumstances. For this purpose, a cam 233 (FIGS. 1 and 11) is fixed to the shaft 228 which carries the catch pan gate 68, the cam having a notch 234 in its edge. A bell-crank lever comprising the arms 235 and 236 is pivoted to rock on a stub-shaft 229b, the upper arm 235 having a roller 235a (FIG. 11) which normally rests against the peripheral edge of the cam 233 but which, when it enters the notch 234, prevents the cam 233 and shaft 228 from turning. The lower arm 236 of the lever carries a roll 240 which is in the path of the resetting lever 104 as the latter rises to close the scale pan. Under normal conditions the solenoid valve V$^1$ (FIGS. 10 and 18) is energized by the action of switch MS$^1$ at the instant the scale pan begins its downward movement, thus admitting air to the cylinder and turning shaft 228 counterclockwise (FIG. 11) to close the catch pan, but if, under those conditions, the electrical energy should fail, so that the solenoid valve V$^1$ would thereby be de-energized and normally allow the catch pan gate to drop open, the engagement of the roll 235a with the notch 234 in the cam will keep the catch pan closed until the power is restored. The resetting lever, in moving upwardly for closing the scale pan and restoring the scale arm to normal position, engages the roll 240 and thus swings the bell-crank lever so as to disengage the roll 235a from the notch in the cam thereby permitting the contents of the catch pan to enter the scale pan to constitute a part of the next weighing.

As above noted, the disc 19 which carries the crankpin 20 for actuating the pushboard, is driven in exact time with the cam 99 which controls the dumping and reclosing of the scale pan, the disc 19 making one revolution for each revolution of the cam 99, that is to say, once during each weighing cycle, the cam and disc turning continually and at uniform speed. This disc 19 is thus available, in accordance with the present invention, as a cycling means for determining whether or not the speed of the spike apron shall vary from cycle-to-cycle, and for this purpose is provided with a switch-actuating device, here shown as a freely turning roll 250 supported at the inner side of the disc 19 by a stud 250a (FIG. 14). This roll 250 is hereinafter referred to as the "control element." For actuation by this control element, two snap-action switches MS$^2$ and MS$^3$ are provided (FIGS. 14 and 18), these switches having the actuating buttons B$^4$ and B$^5$ (FIG. 14) respectively. These switches are carried by a bracket 251 adjustably mounted on a part 252 secured to the machine frame, the switches being spaced apart circumferentially of the disc 19 and, as here shown, having the converging axes of the actuating buttons spaced 30° apart; however, this spacing may be varied according to circumstances. As above described, this disc 19 carries the crankpin 20 to which is connected the rod 21 for actuating the pushboard. The pin 20 projects from the outer face of the disc.

As shown, the disc 19 has an arcuate series of holes H$^2$, into any selected one of which there may be secured the stud 250a, on which is mounted the switch-actuating roll or control element 250. In accordance with the present invention, the arcuate distance between the buttons B$^4$ and B$^5$ constitutes the "control portion" or arc of the weighing cycle. For optimum results, the final deposit of material in the scale pan to complete a predetermined weighing or load, should occur during that part of the weighing cycle in which the control element 250 is moving from the switch button B$^4$ to the button B$^5$. Assuming that the weighing assembly has just been returned to receiving position and that the control element 250 is now located, as shown at FIG. 14, the disc 19 must turn approximately 180° before the control element 250 contacts switch button B$^5$; the pushboard will reach the rearward limit of its path almost at once after switch button B$^5$ has been so contacted, and the cam 99 will dump the scale pan so that its contents will fall in front of the pushboard. With such an arrangement the "control portion" or arc of the weighing cycle is located near the end of the cycle. By shifting the stud 250a into a different one of the holes H$^2$, the location of the control portion of the cycle may be moved nearer to or farther away from the beginning of the cycle.

The operation of the apparatus may best be described by reference to the electrical diagram of FIG. 18, wherein it is indicated that the motor M$^1$, which drives the comb and doffing device, is in a circuit parallel with but not subject to the controls provided for the motor M which drives the spike apron.

In FIG. 18 there is indicated a conventional toggle switch PS for controlling the supply of current to the machine and also a hand-controlled switch HS, by means of which the speed of the spike apron may be manually varied up or down if desired, without reference to the automatic control, for example when, after the spike apron speed has gradually been increased or the contents of the bin 5 are depleted the bin is refilled. Since the delivery apron 27, pushboard (not shown), and compressor roll R are driven through connections to the machine to which the feeder of the present invention delivers the stock, the electrical circuit illustrated does not involve the drive for these parts.

Referring now to FIG. 18, when there is no power in the electrical control system, that is to say, when the switch PS is open and the mechanism is completely idle, a conventional interlock L$^1$ in the control circuit of the motor M which drives the spike apron is closed. Now, when the switch PS is closed, it being assumed that the weighing cycle is about to start and the closed scale pan is ready to receive stock from the spike apron, the microswitch MS$^1$ will be closed through its contact K$^1$ because its actuator arm A$^{10}$ (FIG. 13) is held in raised position by toggle link 94. The interlock L$^1$ opens so that no current can reach microswitch MS$^2$ or either of the solenoid valves V$^1$ or V$^2$, and thus the catch pan gate 68 is open and no reduction in speed of the spike apron can be made while the motor M is running.

*Slow-Down Adjustment To Correct Premature Overbalancing*

(Paragraph X$^1$.) Assuming as above that the scale is in weighing position, the switch MS$^1$ is closed through its contact K$^1$, the coil MC of the spike apron motor M is energized and microswitch MS$^1$ is open through its contact K$^2$, if now the scale overbalances prematurely, because of excessive speed of the spike apron (that is to say, it overbalances before microswitch MS$^2$ is engaged by the control element 250), the microswitch MS$^1$ is thereby released by the downward motion of the scale pan and the circuit is opened at the contact K$^1$; the spike apron motor coil MC will be de-energized to stop the spike apron; the interlock L$^1$ closes the circuit to the microswitch MS$^2$; the motor starter contacts MC$^3$ open (so no power can thereafter reach microswitch MS$^3$); and solenoid valve V$^1$ is energized to close the catch pan gate 68.

When the control element 250 (FIG. 14), carried by the rotary disc 19, thereafter contacts and momentarily closes microswitch MS², an impulse of power energizes solenoid valve V² thereby so activating air cylinder 216 as to actuate the ratchet assembly to turn shaft 36a clockwise (FIG. 5) to make a slow-down adjustment of the motor M which has already stopped or is coasting to a stop. When the actuating element 250 moves out of contact with the microswitch MS² the circuit is opened and solenoid valve V² is de-energized and when the actuating element 250 next contacts and closes microswitch MS³ no energization of solenoid valve V³ occurs such as to make a speed-up adjustment because the circuit to said valve is already open by virtue of the open contact MC³ in the starter of the spike apron motor.

NOTE: When the scale overbalances prematurely, as above described, the switch MS¹ closes through its contact K², but no current can get through to solenoid valve V³ to cause a speed-up adjustment when microswitch MS³ is thereafter momentarily closed by the actuating element 250, because contact MC³ in the circuit of the spike apron motor is now open. Under the above circumstances, therefore, circuit relay CR remains unoperated by the closing of microswitch MS³ and the subsequent opening of microswitch MS⁴ by the upward pressure of the resetting arm 104 which resets the scale pan.

*Speed-Up Adjustment Resultant From Belated Overbalancing*

(Paragraph X².) A cycle which starts under this condition begins with the parts in the same relative arrangement as described in Paragraph X¹ above, and the parts so remain until the actuating element 250, carried by the disc 19, contacts the button B⁵ of microswitch MS³.

NOTE: When just previously the actuating element 250 contacted and momentarily closed microswitch MS², interlock L¹ was still open so that no current flowed in the circuit leading to solenoid valve V², so that the latter was not energized and thus no slow-down adjustment took place.

When the actuating element 250 now contacts and momentarily closes microswitch MS³, microswitch MS¹ is still closed through its contact K¹, as is also contact MC³ in the motor starter, so that circuit relay CR is operative to close contacts CR–1 and CR–2 and thus to energize a holding circuit by virtue of the fact that microswitch MS⁴ is also normally closed, although, because microswitch MS¹ is still open through contact K² the circuit leading to solenoid valve V³ is not energized.

When thereafter the scale is belatedly tipped because of a slow moving spike apron, either by attainment of the predetermined weight of stock or else by the cyclical downward motion of the dumping and resetting lever arm 104, the microswitch MS¹ moves in response to the downward motion of the scale pan and the switch MS¹ opens at contact K¹, the spike apron motor coil MC is de-energized to cause the motor M and spike apron to coast to a halt; interlock L¹ closes to energize solenoid valve V¹ and thus to close the catch pan gate 68; and contact MC³ opens but has no effect of significance. Also, switch MS¹ closes through its contact K² thereby energizing solenoid valve V³ and so activating air cylinder 216 as to cause the ratchet assembly to turn shaft 36a counterclockwise (FIG. 5) to cause a speed-up adjustment, although the spike apron is now in the process of coasting to a stop and therefore does not run any faster than it did earlier in the same cycle. The circuit which thus causes a speed-up adjustment includes the closed microswitch MS⁴ and the closed relay contacts CR–1 and CR–2 in circuit relay CR and closed contact K² in switch MS¹.

(Paragraph Y¹). When thereafter microswitch MS⁴ is contacted by and momentarily opened (at the very end of the upward motion of the dumping and resetting lever arm 104), circuit relay CR is de-energized and contacts CR–1 and CR–2 return to their normally open position.

Substantially simultaneously with the occurrence of the operation described in Paragraph Y¹ above, the several parts are returned to their relative positions as noted in Paragraphs X¹ and X² above. Upon completion of the operation described in Paragraph Y¹, the dumping and resetting lever arm 104 moves down out of contact with the actuating pin F of microswitch MS⁴ and also out of contact with the pin 95 (of the toggle joint assembly comprised in the latching mechanism for the scale pan doors) and the lever arm 104 assumes its idle position with the walls of the slot 105 at the end of the lever surrounding but out of contact with the pin 95, so that the scale rests freely in its stock-receiving or weighing position for the start of a new weighing cycle.

The only difference in the situation now prevailing (as contrasted with that described in Paragraphs X¹ and X² above), is that at the beginning of the cycle, now about to take place, the spike apron will run slightly faster than it did in the cycle which has just ended. Conversely, of course, the spike apron will be driven slightly slower in a cycle following one in which a premature overbalancing and a slow-down adjustment has occurred in a preceding cycle.

*Ideally Timed Weighing Calling for No Speed Adjustment*

(Paragraph X³). A cycle involving a situation such as that now suggested starts with all of the elements as stated in Paragraphs X¹ and X² above and they so remain until the scale overbalances with its predetermined weight of fibers as it should after the actuating element 250 has contacted the microswitch MS² but before it has contacted microswitch MS³.

When it does contact and momentarily close microswitch MS² before overbalancing has occurred, interlock L¹ being still open, solenoid valve V² will not be energized, and no slow-down adjustment will be made; this being the same situation as pointed out in the two paragraphs following Paragraph X¹, above.

When now the scale beam does overbalance, the switch MS¹ opens through its contact K¹ so that spike apron motor coil MC is de-energized and thus stops the up-going run 24 of the spike apron; interlock L¹ is now closed to cause energization of solenoid valve V¹ with consequent closure of the catch pan gate 68, but no slow down adjustment is occasioned because microswitch MS² has already been closed and re-opened; contact MC³ in the motor starter is open thereby forestalling any operation of the circuit relay CR and therefore preventing any energization of microswitch MS³; and when switch MS¹ is closed through contact K², it is ineffective to cause a speed-up adjustment due to the still open position of contacts CR–1 and CR–2 of the circuit relay.

Thus, when actuating element 250 now contacts and momentarily closes microswitch MS³, no impulse can occur to energize solenoid valve V³ and thus cause a speed-up adjustment, and so subsequent, momentary opening of microswitch MS⁴ has no effect on circuit relay CR whose contacts are still normally open as just noted. In short, no speed-up adjustment occurs and the next weighing cycle commences with the spike apron travelling at the same speed as it did during the next preceding cycle. This condition will continue until, for example by depletion of the feed hopper, the amount of fiber picked up by the spike apron decreases whereupon the mechanism will commence a cycle such as that above described in the four paragraphs following the above Paragraph X².

While the mechanism herein described and illustrated is the presently preferred embodiment of the invention, it is to be understood that the invention is broadly inclusive of any and all modifications which are the structural and/or functional equivalents of the combination herein claimed.

I claim:

1. In apparatus of the class described whose purpose is to deliver an individual batch of fibrous material of substantially the same prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor element which is operative to receive fibrous material from a bin and deliver it to the scale pan, and variable-speed drive means for the conveyor element which stops automatically in response to the tipping of the scale beam, in combination, means operative, if the speed of the conveyor, while running be less than a predetermined optimum speed, automatically to increase the speed of the conveyor element by a small increment, cycle-after-cycle, until said predetermined optimum speed is attained.

2. In apparatus of the class described whose purpose is to deliver an individual batch of fibrous material of substantially the same prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor element which is operative to receive fibrous material from a bin and deliver it to the scale pan, and variable-speed drive means for the conveyor element which stops automatically in response to the tipping of the scale beam, in combination, means operative, if the speed of the conveyor, while running, be greater than a predetermined optimum speed, automatically to decrease the speed of the conveyor element by a small decrement, cycle-after-cycle, until said predetermined optimum speed is attained.

3. Apparatus of the class described whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and a conveyor which is operative to receive fibrous material from a bin and deliver it to the scale pan, and variable-speed drive means for the conveyor which stops automatically in response to the tipping of the scale beam, and wherein the means for dumping the scale pan comprises a continuously rotating shaft which turns at constant speed, characterized in having automatic means, including a rotary control element, which turns in exact time with said continuously rotating shaft, operative to adjust the linear speed of the conveyor to that predetermined optimum speed at which the pan will dump approximately the same weight of material during each cycle regardless of the rate at which the material is supplied to the conveyor.

4. In a card-feeding machine whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and an endless spike apron, driven by a variable-speed motor, which is operative to receive fibrous material from a bin and deliver it to the scale pan, and wherein the motor which drives the spike apron stops automatically in response to the tipping of the scale beam, and a cycling member which is driven at constant speed and which revolves once for each weighing cycle, the means for opening the scale pan door being actuated by said cycling member, in combination, a rotatable speed control element which makes one revolution per weighing cycle, and means associated therewith, which is effective, during a predetermined fraction only of the revolution of said control element, to determine whether, at the commencement of the next successive cycle, the speed of the motor for driving the spike apron shall remain the same or be different.

5. Apparatus according to claim 4, further characterized in having means whereby said speed control element may be so adjusted as selectively to determine the location of that fractional portion of the cycle during which speed determination shall take place.

6. In a machine whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver it to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, and means whereby, if the scale pan receive material sufficient to tip the scale beam before the control element reaches the beginning of said control portion, the speed of the conveyor driving means is decreased.

7. In a machine designed to deliver a batch of fibrous material of substantially equal prescribed weight during each of successive weighing cycles and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver it to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, and means whereby, if the scale pan has received insufficient material to tip the scale beam when the control element passes the terminus of said control portion, the speed of the drive means for the conveyor will be increased.

8. In a machine designed to deliver a batch of fibrous material of substantially equal prescribed weight during each of successive weighing cycles and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, an endless conveyor operative to receive fibrous material from a bin and deliver it to the scale pan, and variable-speed drive means for the conveyor which stops automatically in response to the tipping of the scale beam, in combination, means for varying the speed of the conveyor including a control element which revolves at constant speed and which makes one complete revolution during each weighing cycle, means defining a control portion of the arc of travel of said control element during which the scale beam should normally tip, means whereby, if the scale beam receives material sufficient to tip the scale beam before the control element reaches the beginning of said control portion, the speed of the conveyor drive means will be decreased, and means whereby, if the scale pan has received insufficient material to tip the scale beam when the control element passes the terminus of said control portion, the means for driving the conveyor will be increased.

9. A machine according to claim 8, wherein the means for increasing or decreasing the speed of the conveyor is operative progressively to increase or decrease the speed, cycle-after-cycle, by a fractional portion of the entire available speed range.

10. A machine according to claim 8, wherein each increment or decrement in speed, preparatory to the start of the next weighing cycle, is of the order of 3% of the upper limit of the speed range.

11. Apparatus according to claim 8, wherein the increment or decrement of speed which is made preparatory to the start of any given cycle is of the order of 9% of the lower limit of the speed range.

12. Apparatus according to claim 8, wherein the linear speed of the conveyor is constant during that portion of each respective weighing cycle within which material is being delivered to the scale pan.

13. Apparatus according to claim 8, wherein the terminus of the control portion of the weighing cycle is located within the last quadrant of said cycle thereby permitting the delivery of material into the scale pan during a major portion of the weighing cycle.

14. Apparatus according to claim 8, further characterized in having manually actuatable means whereby the speed of the conveyor driving means may be varied at will independently of the automatic means for controlling its speed.

15. In a card-feeding machine designed to deliver batches of fibrous material, each of substantially the same prescribed weight, during each of successive weighing cycles and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and an endless spike apron, driven by a variable-speed motor, which is operative to receive fibrous material from a bin and deliver it to the scale pan, and wherein the motor which drives the spike apron stops automatically in response to the tipping of the scale beam, in combination, means for varying the speed of the spike apron including a control element which revolves uninterruptedly at constant speed and makes one complete revolution during each weighing cycle, means defining a control portion of the arc of travel of said control element within which the scale beam should normally tip, and means whereby, if during any cycle the scale pan receives sufficient material to tip the scale beam while the control element is located within the control portion of its path of travel, the speed of the spike apron drive motor will remain the same during the following cycle.

16. In a card-feeding machine designed to deliver batches of fibrous material, each of substantially the same prescribed weight, one during each successive weighing cycle and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and an endless spike apron, driven by a variable-speed motor, which is operative to receive fibrous material from a bin and deliver it to the scale pan, and wherein the motor which drives the spike apron stops automatically in response to the tipping of the scale beam, in combination, means for varying the speed of the spike apron including a control element which revolves uninterruptedly at constant speed and which makes one complete revolution during each weighing cycle, means defining a control portion of the arc of travel of said control element within which the scale beam should normally tip, and means whereby, if the scale beam tips before the control element reaches the beginning of said control portion of the arc of travel of said control element, the speed of the spike apron drive motor will be decreased.

17. In a card-feeding machine designed to deliver batches of fibrous material, each of substantially the same prescribed weight, one during each successive weighing cycle and wherein a scale pan, whose bottom comprises at least one normally closed door, is supported by a fulcrumed beam which tips in response to a predetermined load in the pan, means operative, during each weighing cycle, regardless of the weight of material in the pan to open said door thereby to dump the contents of the pan, and an endless spike apron, driven by a variable-speed motor, which is operative to receive fibrous material from a bin and deliver it to the scale pan, and wherein the motor which drives the spike apron stops automatically in response to the tipping of the scale beam, in combination, means for varying the speed of the spike apron including a control element which revolves uninterruptedly at constant speed and which makes one complete revolution during each weighing cycle, means defining a control portion of the arc of travel of said control element within which the scale beam should normally tip, and means whereby, if the scale pan has not tipped when the control element passes the terminus of the control portion of its arc of travel, the speed of the spike-apron motor will be increased.

18. In a card-feeding machine whose purpose is to deliver an individual batch of fibrous material of substantially equal prescribed weight during each of successive weighing cycles, each extending for the same length of time, and wherein a scale pan, whose bottom comprises at least one normally closed door, is supported by a fulcrumed beam which tips in response to a predetermined load in the pan, means operative, during each weighing cycle, regardless of the weight of material in the pan, to open said door thereby to dump the contents of the pan, and an endless spike apron driven by a variable-speed motor which is operative to receive fibrous material from a bin and deliver it to the scale pan, and the motor which drives the spike apron stops automatically in response to the tipping of the scale beam, wherein the speed of the motor for driving the spike apron is varied by turning a shaft in one direction or the other, respectively, in combination, means operative to turn said shaft thereby progressively to increase or decrease the speed of the spike apron step-by-step, but only one step during each successive weighing cycle.

19. Apparatus according to claim 18, wherein the means for turning the speed-varying shaft comprises a pair of ratchet wheels having oppositely directed teeth, a pawl for advancing each respective ratchet wheel, one tooth at a time, and means for selectively determining whether one or another of said pawls shall effectively engage its respective wheel during a given weighing cycle.

20. Apparatus according to claim 18, wherein the means for turning the speed-varying shaft comprises a pair of ratchet wheels having oppositely directed teeth, a pawl for advancing each respective ratchet wheel, one tooth at a time, a control element which rotates once for each weighing cycle, and means operative, in response to the position of the control element when the scale beam tips, to determine whether one or another of said pawls shall be operative to advance its respective ratchet wheel.

21. Apparatus according to claim 19, further characterized in having a lever of the first order to whose opposite arms the respective pawls are pivotally connected, means normally holding said lever in neutral position such that neither pawl operatively engages its respective ratchet wheel, and means operative to rock said lever in one direction or the other respectively, from its neutral position, but not more than once during a given weighing cycle, thereby to turn the speed-varying shaft.

22. Apparatus according to claim 19, wherein the pawls are pivotally connected to the opposite ends, respectively, of a lever of the first order, a motor device for operatively rocking said lever, said motor device comprising a reciprocable part which normally occupies a neutral position such that neither of said pawls is in effective engagement with its respective ratchet, and means for so energizing the motor device, at times, as to move said reciprocable part in one direction or the other from its neutral position but not more than once during any given weighing cycle, thereby to cause one pawl or another to turn its respective ratchet wheel one step forward.

23. Apparatus according to claim 22, further characterized in that the motor device for rocking the lever is a fluid pressure motor comprising a cylinder and a piston therein, said reciprocable part being connected to the piston, means connecting said reciprocable part to the lever thereby to rock the lever, means providing a supply of pressure fluid, valves operative to admit fluid alternatively to the opposite ends, respectively, of the motor cylinder, said valves normally being closed, means, including a weight, operative normally to hold the piston in midposition, a control element which revolves once during each weighing cycle, and means sensitively responsive to the position of the control element, when the scale beam tips, to determine whether pressure fluid shall be admitted to one or the other end of the motor cylinder.

24. In a card-feeding machine designed to deliver a batch of fibrous material of substantially the same prescribed weight during each of successive weighing cycles and wherein a scale pan, whose bottom comprises two normally closed doors, is supported by a fulcrumed beam which tips in response to a predetermined load in the pan, means operative, during each weighing cycle, regardless of the weight of material in the pan, to open said doors thereby to dump the contents of the pan, and an endless spike apron, driven by a variable-speed electric motor, which is operative to receive fibrous material from a bin and deliver it to the scale pan, and wherein the motor which drives the spike apron stops automatically in response to the tipping of the scale beam, in combination, means for varying the speed of the spike apron motor including a speed control element which revolves uninterruptedly at constant speed and makes one complete revolution during each weighing cycle, means defining a control portion of the arc of travel of said speed control element within which the scale beam should normally tip, and means whereby, if during any cycle the scale pan receives sufficient material to tip the scale beam while the control element is located within the control portion of its path of travel, the speed of the spike apron drive motor will remain the same during the next following cycle, further characterized in having snap-action electrical switches which define the opposite ends, respectively, of the control portion of the path of travel of the control element, the said control element including a switch-actuating member operative to actuate said switches successively as it revolves.

25. Apparatus according to claim 24, wherein said switch-actuating member may be adjusted thereby to vary the interval of time between the actuation of the second of said pair of switches and the dumping of the scale pan.

26. Apparatus according to claim 24, further characterized in that the first of said pair of switches to be actuated, as the control element revolves, is that which is operative to determine whether or not the speed of the spike apron motor shall be less during the next following cycle.

27. Apparatus according to claim 24, further characterized in that the second of said pair of switches to be actuated, as the control element revolves, is operative to determine whether or not the speed of the spike apron shall be greater during the next weighing cycle.

28. In a card-feeding machine designed to deliver a batch of fibrous material of substantially equal prescribed weight during each of successive weighing cycles and wherein a scale pan, whose bottom comprises two normally closed doors, is supported by a fulcrumed beam which tips in response to a predetermined load in the pan, means operative, during each weighing cycle, regardless of the weight of material in the pan, to open said doors thereby to dump the contents of the pan, and an endless spike apron driven by a variable-speed, rotary, electric motor which is operative to receive fibrous material from a bin and deliver it to the scale pan, and wherein the motor which drives the spike apron stops automatically in response to the tipping of the scale beam, a rotatable shaft for controlling the speed of the spike apron drive motor, a pair of ratchet wheels fixed to said shaft, a pair of pawls cooperable with the teeth of the respective wheels and which are operative to turn the wheels in opposite directions, respectively, a double-acting fluid pressure motor operative to actuate one or the other of said pawls, alternatively, thereby to vary the speed of the spike apron motor up or down, respectively, by small increments, a pair of solenoid valves for admitting pressure fluid to said motor thereby to actuate one or the other of said pawls, respectively, accordingly as one or the other of said valves is actuated, said valves being in circuit with the respective switches which define the opposite ends of the control portion of the arc of travel of the speed control element, the circuit being such that if the scale overbalances before the control element reaches the first, in order, of said switches during a weighing cycle, that pawl will be actuated which turns the speed control shaft to produce a lower speed of the spike apron whereas, if the scale beam does not overbalance until after the control element has passed the second in succession of said switches, the motor will be actuated to turn the control shaft so as thereby to increase the speed of the spike apron drive motor.

29. In a card-feeding machine designed to deliver a batch of fibrous material of substantially equal prescribed weight during each of successive weighing cycles and wherein a scale pan, whose bottom comprises a plurality of normally closed doors, is supported by a fulcrumed beam which tips in response to a predetermined load in the pan, means operative, during each weighing cycle, regardless of the weight of material in the pan, to open said doors thereby to dump the contents of the pan, and an endless spike apron driven by a variable-speed, rotary, electric motor which is operative to receive fibrous material from a bin and deliver it to the scale pan, and wherein the motor which drives the spike apron stops automatically in response to the tipping of the scale beam, in combination, a cycling member which is driven at constant speed and which revolves once for each weighing cycle, the means for opening the scale pan door being actuated by said cycling member, further characterized in having a rotatable speed control element which makes one revolution per weighing cycle and which is effective, during a predetermined fraction only of each cycle, to determine whether, at the commencement of the next successive cycle, the speed of the spike apron motor shall be the same or different, the means for varying the speed of the spike apron motor comprising a rotary shaft and a pawl and ratchet assembly for turning said shaft step-by-step in one or the other direction, respectively, and means responsive to said speed control element to determine whether the pawl and ratchet assembly shall turn said shaft in one or the other direction.

30. Apparatus according to claim 29, wherein the means for turning said shaft in one direction or the other comprises an assembly including two oppositely toothed ratchet wheels and a pawl for turning each respective ratchet wheel, motor means for actuating the pawls, and means responsive to said speed control element to determine which of said pawls shall be actuated thereby to determine which, if either of said pawls, shall be actuated by said motor means.

31. Apparatus according to claim 30, further characterized in that each ratchet wheel has a blank tooth so located as to prevent overtravel of the rotary speed-varying shaft.

32. Apparatus according to claim 29, wherein the means for determining whether said shaft shall turn in one direction or the other comprises a pair of independent electrically energized devices and a pair of switches cooperable with said control element for determining the supply of current to one or another of said electrically energized devices.

33. In a card-feeding machine whose purpose is to deliver an individual batch of fibrous material of substantially equal prescribed weight during each of successive weighing cycles each occupying the same length of time, and wherein a scale pan, whose bottom comprises a plurality of normally closed doors, is supported by a fulcrumed beam which tips in response to a predetermined load in the pan, means operative, during each weighing cycle, regardless of the weight of material in the pan, to open said doors thereby to dump the contents of the pan, and an endless spike apron driven by a variable-speed electric motor, which is operative to receive fibrous material from a bin and deliver it to the scale pan, and wherein the motor which drives the spike apron stops automatically in response to the tipping of the scale beam, in combination, means operative alternatively to increase or decrease the speed of the spike apron driving motor step-by-step during a plurality of successive cycles.

References Cited in the file of this patent

UNITED STATES PATENTS

| | | |
|---|---|---|
| 2,164,796 | Bird | July 4, 1939 |
| 2,221,396 | Evoy | Nov. 12, 1940 |
| 2,623,658 | Johansen | Dec. 30, 1952 |
| 2,796,197 | Criddle | June 18, 1957 |

Disclaimer 3,119,525.—*Francis W. Flynn*, West Boylston, Mass. CARD-FEEDER. Patent dated Jan. 28, 1964. Disclaimer filed Mar. 4, 1965, by the assignee, *Geo. S. Harwood & Son, Inc.*

Hereby enters this disclaimer to claims 1, 2, 3, 6, 7, 8, 9, 13 and 14 of said patent.

[*Official Gazette June 15, 1965.*]